Figure 1:
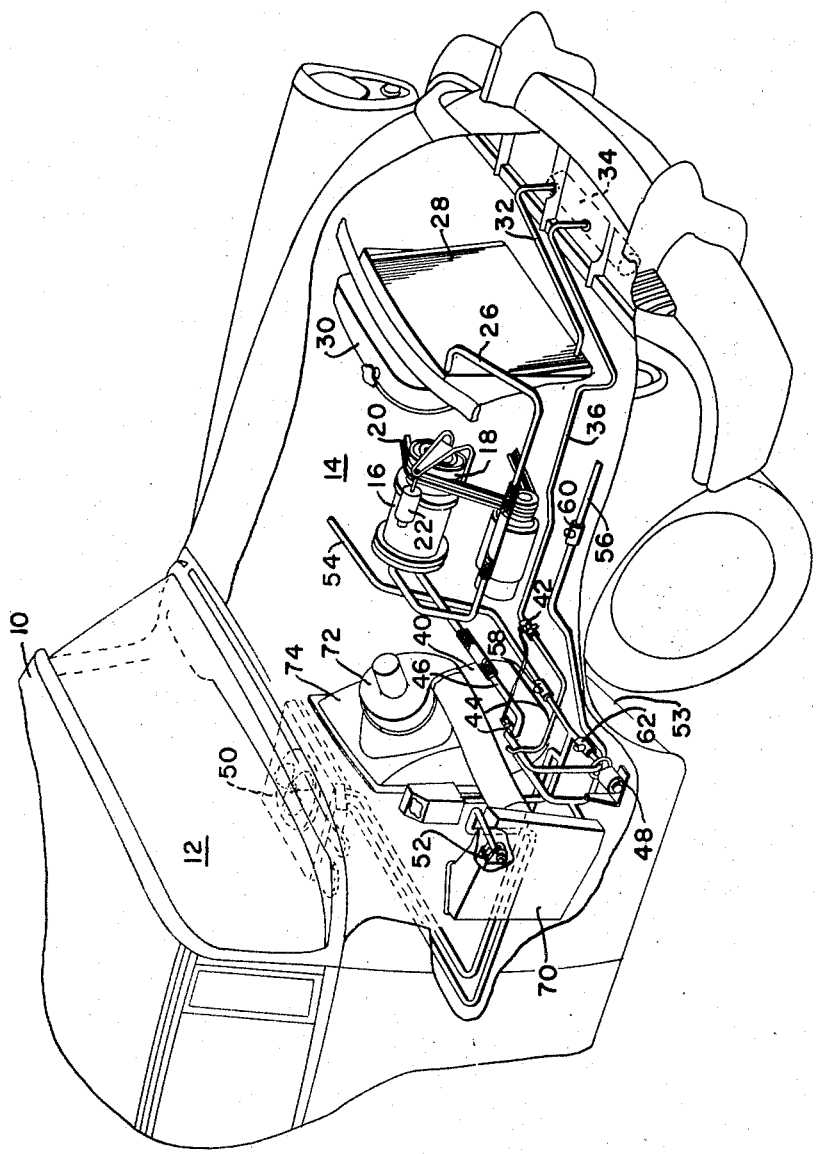

INVENTOR.
Ronald K. Evans
BY R. R. Candor
His Attorney

United States Patent Office 2,787,129
Patented Apr. 2, 1957

2,787,129

AUTOMOBILE REFRIGERATING APPARATUS

Ronald K. Evans, Birmingham, Mich., assignor to General Motors Corporation, Detroit, Mich., a corporation of Delaware Application May 19, 1954, Serial No. 430,928

3 Claims. (Cl. 62—4)

This invention relates to refrigerating apparatus more particularly to an automobile air conditioning system.

It is an object of this invention to provide a simplified automobile air conditioning system wherein the air contacting coils may be used for either heating or cooling the air in the passenger compartment of the car.

Another object of this invention is to utilize the fluid of the engine cooling system in the air conditioning system. More particularly, it is an object of this invention to devise a system using a special coolant which is circulated in a closed system. The system contemplates operating the main car engine at a temperature around 230° in comparison with the past practice of operating at engine temperatures of approximately 180°.

Still another object of this invention is to provide an automobile air conditioning system in which the entire refrigerating system and the main air contacting coil are all mounted in the engine compartment of the car.

Further objects and advantages of the present invention will be apparent from the following description, reference being had to the accompanying drawings, wherein a preferred form of the present invention is clearly shown.

Figure 2:
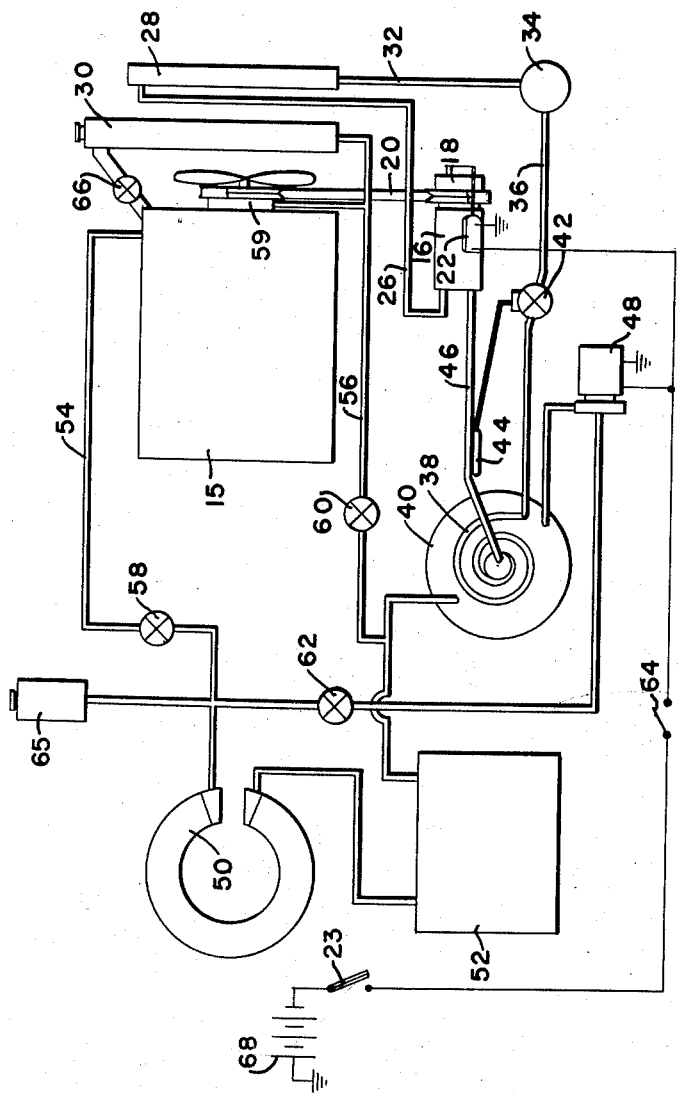

In the drawings:

Figure 1 is a perspective view with parts broken away showing somewhat diagrammatically the invention applied to a modern automobile; and, Figure 2 is a schematic view showing the refrigeration and water systems used in the car.

Referring now to Figure 1 of the drawing wherein a preferred embodiment of the invention has been shown, reference numeral 10 generally designates a passenger automobile having a passenger compartment 12 and an engine compartment 14 in which the main car engine 15 (omitted in Figure 1 for the sake of clarity) is mounted in accordance with standard practice. Reference numerals 50 and 52 designate air tempering coils which may be used for either heating or cooling the passenger compartment. When used for heating the air the coils are connected to the engine cooling system and when used for cooling the air the coils are connected to a refrigerant system and isolated from the engine cooling system by closing the valves 58 and 60.

The air cooling equipment comprises a refrigerant compressor 16 which is adapted to be driven from the main car engine through a clutch 18 and belts 20 which are used to transmit power from the crank shaft of the car engine to the compressor. The clutch 18 and the controls therefore are preferably of the general type shown in copending applications Serial No. 365,593, filed July 2, 1953 and Serial No. 376,606, filed August 26, 1953, now Patent No. 2,747,385 granted May 29, 1956, respectively.

The clutch is operated by a solenoid 22 which is preferably automatically controlled by a thermostat 23 which responds to changes in air temperature within the passenger compartment of the car. Operation of the clutch serves to start and stop the compressor in response to changes in the cooling requirements. In so far as certain aspects of this invention are concerned other types of controls could be used.

The compressor 16 is adapted to discharge compressed refrigerant through a line 26 into a refrigerant condenser 28 mounted directly in front of the main car engine radiator 30. The condensed refrigerant flows through a line 32 into a receiver 34 from whence the liquid refrigerant flows through a line 36 into an evaporator 38 forming a part of a heat interchanger assembly 40. The flow of refrigerant through the line 36 is controlled by means of a thermostatic expansion valve 42 which includes the usual thermostatic bulb 44 located on the suction line 46 which conveys the vaporized refrigerant to the compressor 16.

The heat interchanger 40 serves to refrigerate that portion of the coolant liquid which is circulated between the air contacting coils and the heat interchanger by means of a pump 48. The pump 48 is also contorlled by the thermostat 23 and starts and stops with the compressor 16. The coil 50 is preferably located beneath the car seat and corresponds to the present "underseat" heater while the coil 52 is mounted in a housing 70 which is in effect mounted in the hollow portion of the right front fender directly behind the usual front wheel shroud 53 which extends downwardly directly in back of the front wheel.

When the car engine is running and refrigeration is required, the clutch 18 will be engaged so as to drive the compressor and thereby cause refrigeration of the water in the heat interchanger 40. The refrigerated water is then circulated by the pump 48 through air contacting coils 50 and 52.

When it is desired to supply heating to the passenger compartment rather than cooling the master control switch 64 would be opened, the valves 58 and 60 would be opened and the valve 62 would be closed so that hot liquid from the cooling system of the car engine 15 would be circulated by the main water pump 59 to the air contacting coils 50 and 52 in accordance with standard car heating practice. The liquid used is preferably a mixture of pure water, ethylene glycol and a detergent which circulates in a closed system somewhat comparable to the hydraulic brake system of a car. A reservoir 65 is provided in the system as shown in Figure 2 of the drawing. As shown in the drawing, a thermostat 66 is provided in the connection between the engine radiator 30 and the car engine 15 and serves to block off the flow of water to the engine radiator at engine temperatures below 230°.

The main car battery 68 supplies the necessary current for operating the water pump 48 and the clutch operating solenoid 22. The air to be conditioned by the coil 52 is forcefully circulated over the coil 52 by means of a fan 72 located in the engine compartment of the car. The fan 72 is preferably supported on the so-called blister 74 located on the front side of the dashboard of the car. By virtue of the above described construction and arrangement it is possible to mount the entire refrigeration system in front of the fire wall or dashboard which separates the engine compartment from the passenger compartment and to use simple and inexpensive controls.

While the form of embodiment of the invention as herein disclosed constitutes a preferred form, it is to be understood that other forms might be adopted, as may come within the scope of the claims which follow.

What is claimed is as follows:

1. An air conditioning system for an automobile having a passenger compartment and an engine in an engine compartment comprising in combination, heat exchange means arranged in thermal exchange relation with air to be conditioned for said passenger compartment, a refrigeration system disposed wholly within said engine compartment and including an evaporator, a compressor and a condenser, power transmitting means including a clutch between said engine and said compressor, means including a pump for circulating liquid from said heat exchange means in thermal exchange relationship with said evaporator, and a thermostat responsive to temperatures within said passenger compartment for declutching said clutch when no refrigeration is required.

2. In combination; an automobile having an engine compartment, a passenger compartment, and an engine in said engine compartment; a refrigerating system disposed wholly within said engine compartment and including an evaporator, a compressor, and a condenser connected in refrigerant flow relationship; power transmitting means between said engine and said compressor including a clutch for disengaging said compressor from said engine when no cooling is required; and a liquid circulating system; said liquid circulating system including a heat exchanger and interchanger means for transferring heat from said liquid to said evaporator; a circulating pump between said heat exchanger and said interchanger means; fan means in said engine compartment for circulating air for said passenger compartment in thermal exchange relationship with said heat exchanger; and a thermostat responsive to the temperature within said passenger compartment for controlling the operation of said pump and clutch.

3. In combination with a vehicle driven by a variable speed automobile engine and having a passenger compartment to be cooled, a volatile refrigerant system including a compressor, a condenser and an evaporator, a heat exchanger thermally associated with said passenger compartment, power transmitting means including a clutch between said compressor and said engine, a liquid circulating system including said heat exchanger and an interchanger portion for transferring heat to said evaporator, said liquid circulating system including a pump between said heat exchanger and said interchanger portion, and a thermostat located in said passenger compartment for controlling the operation of said pump and said clutch.

References Cited in the file of this patent
UNITED STATES PATENTS

| | | |
|---|---|---|
| 1,943,965 | Hulse | June 16, 1934 |
| 2,106,515 | Wanamaker | Jan. 25, 1938 |
| 2,130,995 | Henny | Sept. 20, 1938 |
| 2,180,760 | Mayo | Nov. 21, 1939 |
| 2,183,452 | Gibbs et al. | Dec. 12, 1939 |
| 2,305,155 | Gould | Dec. 5, 1942 |
| 2,349,671 | Newton | May 23, 1944 |
| 2,667,045 | McCarty | June 26, 1954 |